I. M. JACOBS AND W. CRAMER.
SEAT FOR MOTOR VEHICLES.
APPLICATION FILED OCT. 26, 1917.
1,315,842.
Patented Sept. 9, 1919.
2 SHEETS—SHEET 2.
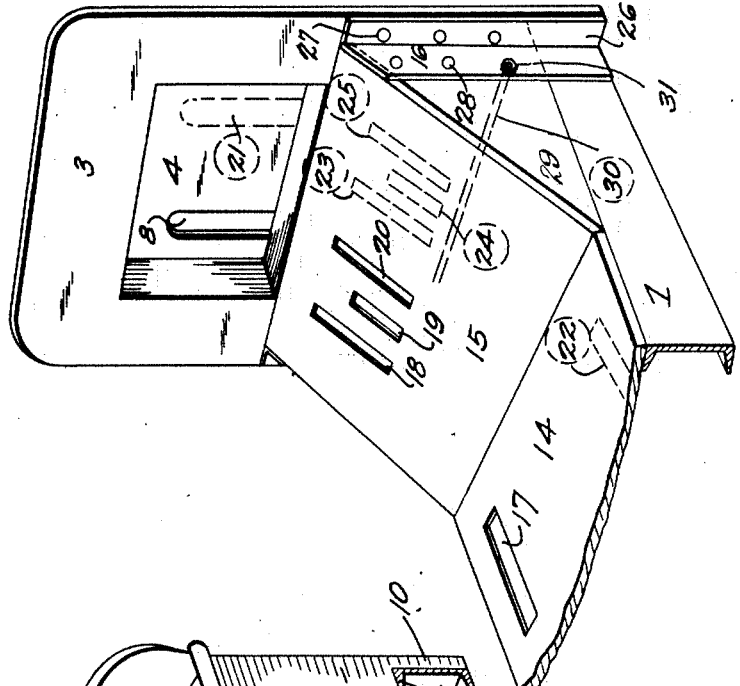
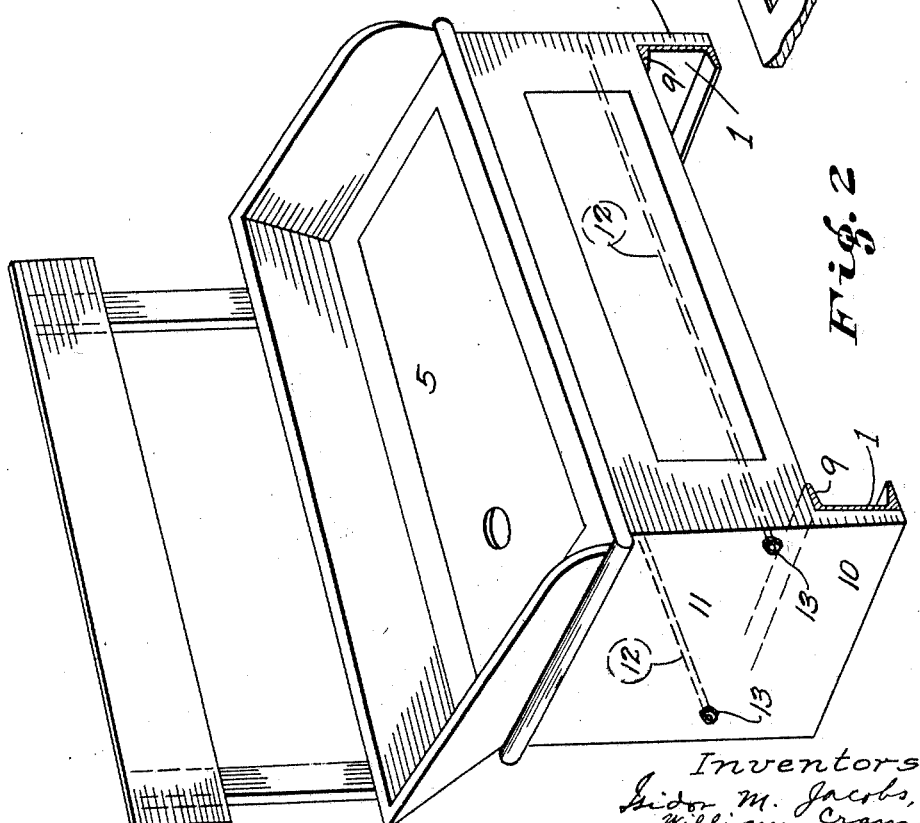

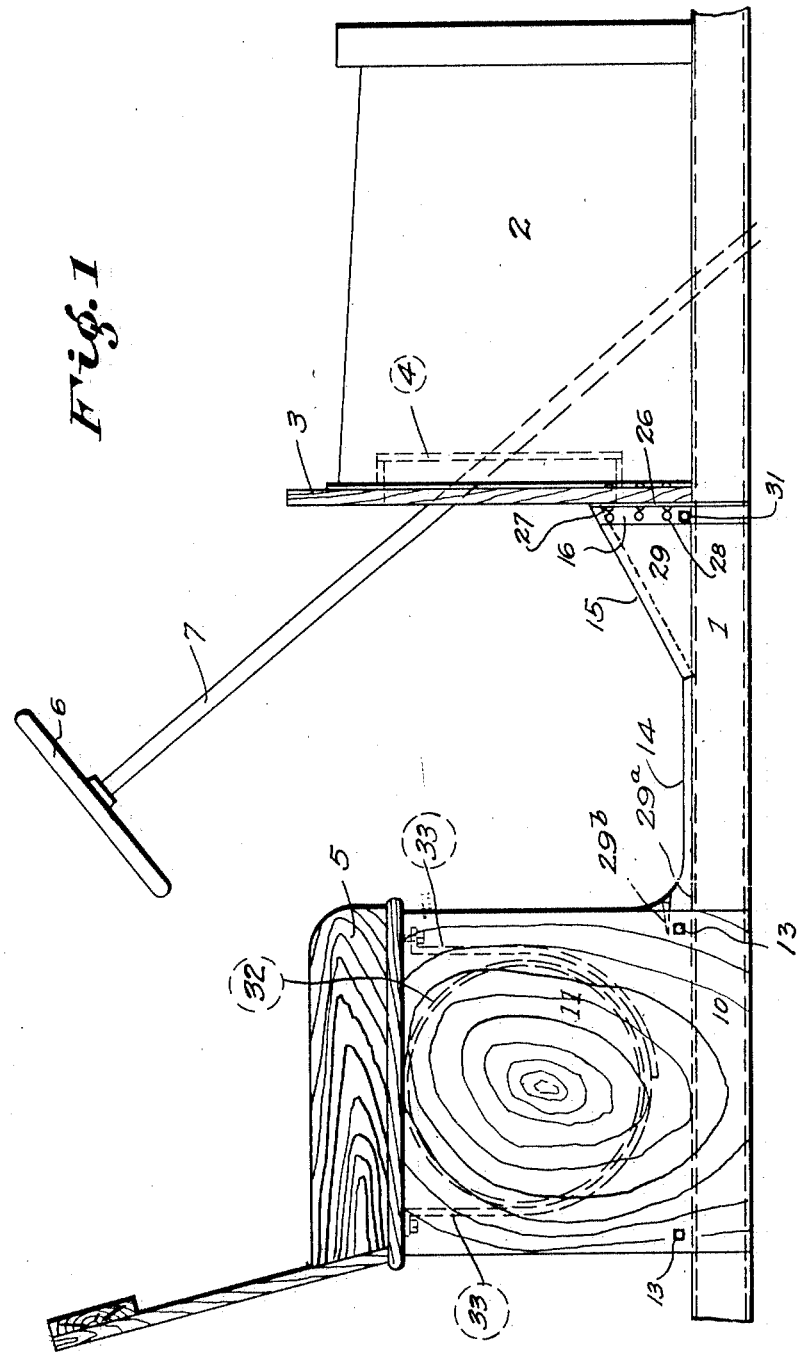

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

SEAT FOR MOTOR-VEHICLES.

1,315,842.   Specification of Letters Patent.   Patented Sept. 9, 1919.

Application filed October 26, 1917. Serial No. 198,645.

*To all whom it may concern:*

Be it known that we, ISIDOR M. JACOBS and WILLIAM CRAMER, citizens of the United States, residing at Kansas City, in the State of Missouri, and St. Louis, Missouri, respectively, have invented certain new and useful Improvements in Seats for Motor-Vehicles, of which the following is a specification.

This invention, while it may be of general utility, is especially designed in aid of the salvaged constructions contemplated by the application for patent Serial Number 163,652, filed by one of the joint inventors herein named, and has for its object the ready utilization of salvaged motor vehicle parts and provides a construction whereby the seat and connected parts, such, for instance as the floor boards, dash board, and cowl may be located at any point upon a standard or other chassis to accommodate a relatively longer or shorter salvaged engine.

In the accompanying drawings forming part of this specification in which like numbers of reference denote like parts wherever they occur, Figure 1 is a side elevation showing part of the chassis, the hood, and the seat;

Fig. 2 is a perspective view of the seat showing its mode of attachment to the chassis; and Fig. 3 is a perspective view of the floor boards, dash board, and cowl.

The chassis 1 supports the engine contained within the hood 2 and supports also the dash board 3 bearing the cowl 4, and likewise supports the seat 5. The steering wheel 6 is supported by the steering post 7 which passes through the hole 8 in the cowl 4 and connects with the front wheels of the vehicle in the usual manner.

The seat frame rests upon the flanges 9 of the channel members forming the chassis 1 and extensions 10 of the side members 11 of the seat supporting frame extend along the web of the said channel members. The said seat frame may be located at any desired position in the length of the chassis.

In order to give rigidity to the side members 11 of the seat frame and to cause the extensions 10 thereof to bear against the webs of the channel members forming the chassis 1 so as to cause the seat to remain stationary at any determined spot upon the chassis 1, tie rods 12 having at one end a bolt head and a nut 13 at the other pass from the outside of one of the side members 11 to the outside of the other side member 11 and the nuts 13 tightened on the said tie rods 12 draw the side members 11 and their extensions 10 together and into tight engagement with the chassis 1.

In the constructions contemplated by the above mentioned application, the salvaged or other engines used will be of greater or less length, and for this reason it is necessary that the dash board 3 shall be located farther forward or back, as the case may be. This necessitates relative location of the seat 5 farther back or forward as made necessary by the location of the dash board. The same remarks *mutatis mutandis* apply to the floor boards 14 and 15, the former of which is supported by the chassis 1 and the latter by uprights 16 attached to the chassis 1.

The cowl board 4 having the steering post hole 8, the floor board 14 with the brake hole 17, and the floor board 15 with the clutch hole 18, reverse hole 19, and the brake hole 20, can all be reversed from the position shown in the drawings for a left hand drive machine to the position shown in dotted lines at 21, 22, 23, 24, and 25 respectively. For this purpose it will be necessary only to turn the floor boards 14 and 15 upside down from the position shown in Fig. 3, and to turn around, end for end, the board or plate of the cowl containing the hole 8. The dash board 3 is supported from the chassis 1 by the uprights 26 to which it is fastened by bolts 27 or other suitable means, and the dash board 3 may be located at any suitable place on the chassis 1 to accommodate the greater or less length of the engine. The uprights 16 and 26 are integral with each other.

The supports 16 for the floor board 15 which are fastened by bolts or screws 28 to side boards 29 are drawn together by tie rod 30 having a bolt head at one end and a nut 31 at the other, making the same tight upon the chassis 1, in order to keep the same in a fixed position and otherwise to lend rigidity to the structure. Side-boards 29 rest upon the member 1, as shown in Fig. 3. and the floor-board 14 rests upon member 1. The floor-board 15 is a continuation of floor-board 14, but rests upon side-board 29, the said floor-board 14 being secured at 29ᵃ by the screws 29ᵇ. Side-boards 29 are short triangular pieces resting on top of frame 1 and under board 15, terminating at the line between boards 14 and 15.

The gasolene tank 32 may be supported from the seat by straps 33 or other suitable means.

Having thus described this invention, we hereby reserve the benefit of all changes in form, arrangement, order, or use of parts, as it is evident that many minor changes may be made therein without departing from the spirit of this invention, or the scope of the following claims.

We claim—

1. The combination of a chassis, a detachable seat resting thereon, a detachable dash board supported by the chassis, floor boards arranged on the chassis between the said seat and dash board, said dash board and seat being located upon the chassis at points relative to each other and dependent upon the length of the engine, side members depending from the seat on opposite sides of the chassis, and means for drawing said side members toward each other to clamp the seat on the chassis.

2. The combination of a chassis, a seat resting thereon, a dash board supported thereby, floor boards arranged between the seat and the dash board, said dash board and seat being located upon the chassis at points relative to each other and dependent upon the length of the engine, side members carried by the seat and extending below the seat support proper on opposite sides of the chassis, and tie rods extending through said side members and adapted to draw them into clamping engagement with the chassis.

3. The combination of a motor vehicle chassis, a seat resting thereon, a dash board, a cowl board carried by said dash board and provided with a steering post opening, and floor boards positioned between the seat and dash board, said dash board and seat being located upon the chassis at points relative to each other and dependent upon the length of the engine, said cowl board and floor boards being reversible end for end for use with either a right or left hand drive motor vehicle.

4. The combination of a chassis, a detachable seat resting thereon, means for clamping the opposite sides of the seat to the chassis, a detachable dash-board, floor-boards arranged between the seat and dash-board, and means independent of the seat-clamping means for clamping the dash-board to the chassis.

5. The combination of a chassis, a seat mounted thereon, a dash-board mounted thereon, side-boards positioned to extend from the dash-board toward said seat, floor-boards arranged upon said side-boards and the chassis, uprights attached to said dash-board and side-boards and depending on opposite sides of the chassis, and means for clamping said uprights to the chassis.

6. The combination of a chassis, a seat mounted thereon, a dash-board mounted thereon, side-boards positioned to extend from the dash-board toward said seat, floor-boards arranged upon said side-boards and the chassis, uprights attached to said dash-board and side-boards and depending on opposite sides of the chassis, and tie-rods extending through said uprights and side-boards for rigidly clamping the uprights to the chassis.

In testimony whereof we hereunto affix our signatures.

ISIDOR M. JACOBS.
WILLIAM CRAMER.

Copies of this patent may be obtained for five cents each, by addressing the "Commissioner of Patents, Washington, D. C."